US010782704B2

(12) United States Patent
Vladimerou et al.

(10) Patent No.: US 10,782,704 B2
(45) Date of Patent: Sep. 22, 2020

(54) DETERMINATION OF ROADWAY FEATURES

(71) Applicant: Toyota Motor Engineering & Manufacturing North America, Inc., Plano, TX (US)

(72) Inventors: Vladimeros Vladimerou, Whitmore Lake, MI (US); Miles J. Johnson, Ann Arbor, MI (US); Guarav Bansal, Mountain View, CA (US); Ahmed Sakr, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 388 days.

(21) Appl. No.: 15/883,675

(22) Filed: Jan. 30, 2018

(65) Prior Publication Data

US 2018/0217612 A1 Aug. 2, 2018

Related U.S. Application Data

(60) Provisional application No. 62/452,236, filed on Jan. 30, 2017, provisional application No. 62/572,954, filed on Oct. 16, 2017.

(51) Int. Cl.
*G05D 1/02* (2020.01)
*G08G 1/01* (2006.01)
(Continued)

(52) U.S. Cl.
CPC ........... *G05D 1/0276* (2013.01); *G01C 21/26* (2013.01); *G01C 21/32* (2013.01); *G08G 1/0112* (2013.01);
(Continued)

(58) Field of Classification Search
None
See application file for complete search history.

(56) References Cited

U.S. PATENT DOCUMENTS 5,390,118 A * 2/1995 Margolis ............... G01S 17/931
701/23
6,718,259 B1 * 4/2004 Khosla .................... G08G 1/166
701/536
(Continued)

OTHER PUBLICATIONS

Caveney, D., "Cooperative Vehicular Safety Applications", IEEE Control Systems Magazine, Aug. 2010, pp. 38-53 (16 pages).
(Continued)

*Primary Examiner* — Shelley Chen
(74) *Attorney, Agent, or Firm* — Christopher G. Darrow; Darrow Mustafa PC (57) ABSTRACT

One or more roadway features can be determined based on information received from one or more vehicles traveling on a roadway. A data packet can be received from a remote vehicle. The data packet can include data corresponding to locations and headings of the remote vehicle. A path history for the remote vehicle can be determined based on the data packet. The path history can include data points corresponding to a plurality of locations and headings for the remote vehicle. A geometry for a portion of the roadway preceding the remote vehicle can be determined using the path history. The determined geometry of the roadway can be used to determine a driving maneuver for a vehicle and/or to verify a map.

28 Claims, 4 Drawing Sheets

(51) Int. Cl.
*G01C 21/26* (2006.01)
*G01C 21/32* (2006.01)
*G08G 1/0967* (2006.01)
*G08G 1/04* (2006.01)
*G08G 1/0968* (2006.01)
*G08G 1/052* (2006.01)

(52) U.S. Cl.
CPC ......... *G08G 1/0129* (2013.01); *G08G 1/0141* (2013.01); *G08G 1/04* (2013.01); *G08G 1/052* (2013.01); *G08G 1/096725* (2013.01); *G08G 1/096775* (2013.01); *G08G 1/096811* (2013.01); *G08G 1/096844* (2013.01)

(56) References Cited

U.S. PATENT DOCUMENTS

| | | | |
|---|---|---|---|
| 9,079,587 | B1 | 7/2015 | Rupp et al. |
| 9,435,654 | B2 | 9/2016 | Ibrahim et al. |
| 2002/0049116 | A1* | 4/2002 | Shiiba ................ F16H 61/0213 477/97 |
| 2008/0082261 | A1 | 4/2008 | Tengler et al. |
| 2010/0036578 | A1* | 2/2010 | Taguchi ................ B60W 40/04 701/93 |
| 2010/0076621 | A1* | 3/2010 | Kubotani ................ G08G 1/166 701/1 |
| 2010/0299109 | A1* | 11/2010 | Saito ................ G06K 9/00798 703/1 |
| 2011/0118967 | A1* | 5/2011 | Tsuda ................ B60W 30/10 701/117 |
| 2011/0235861 | A1* | 9/2011 | Nitanda ................ G06K 9/00798 382/103 |
| 2013/0076538 | A1* | 3/2013 | Uno ................ G08G 1/096716 340/905 |
| 2014/0358322 | A1* | 12/2014 | Ibrahim ................ G01C 21/30 701/1 |
| 2016/0075280 | A1* | 3/2016 | Shin ................ B60W 30/12 348/148 |
| 2016/0114800 | A1* | 4/2016 | Shimizu ................ B60W 30/14 701/70 |
| 2017/0205235 | A1 | 7/2017 | Vladimerou |
| 2017/0270373 | A1* | 9/2017 | Kawasaki ................ B60R 21/00 |
| 2018/0068565 | A1* | 3/2018 | Smith ................ G08G 1/161 |

OTHER PUBLICATIONS

Sakr, A., "V2V and On-Board Sensor Fusion for Road Geometry Estimation", IEEE ITSC 2017, Oct. 19, 2017, Yokohama, Japan (8 pages).

Fatemi, M., "Road Geometry Estimation Using a Precise Clothoid Road Model and Observations of Moving Vehicles", Proc. of 17th Intl. IEEE Conf. Intelligent Transportation Systems (ITSC), Qingdao, 2014 (7 pages).

* cited by examiner

DETERMINATION OF ROADWAY FEATURES

CROSS-REFERENCE TO RELATED APPLICATIONS

This application claims the benefit of U.S. Provisional Application No. 62/452,236, filed on Jan. 30, 2017, and U.S. Provisional Application No. 62/572,954, filed on Oct. 16, 2017, both of which are incorporated herein by reference in their entirety.

FIELD

The subject matter described herein relates in general to vehicles and, more particularly, to the determination of roadway features using information received from remote vehicles.

BACKGROUND

Some vehicles include a communications system, which enable the exchange of data between the vehicle and one or more elements external to the vehicle. Examples of such communication systems include vehicle-to-vehicle (V2V) and vehicle-to-infrastructure (V2I) communications.

Additionally, some vehicles may have access (either through local storage or through remote access) to maps. These maps can be used for various purposes (i.e., identifying nearby landmarks and navigation).

SUMMARY

In one respect, the subject matter described herein is directed to a method of determining one or more roadway features. The method can include receiving a data packet from a remote vehicle. The data packet can include data corresponding to a first location and a first heading of the remote vehicle. The method can also include determining, based on the data packet received from the remote vehicle, a path history for the remote vehicle. The path history can include data points corresponding to a plurality of locations and headings, including the first location and the first heading and one or more previous locations and headings of the remote vehicle. The method can also include determining, using the determined path history, a geometry for a portion of the roadway preceding the remote vehicle.

In another respect, the subject matter described herein is directed to a system for determining one or more roadway features. The system can include a communications device configured to receive a data packet from a remote vehicle. The data packet can includes data corresponding to a first location and heading of the remote vehicle. The system can also include a processor operatively connected to the communications device. The system can also include memory operatively connected to the processor. The memory can store instructions that, when executed by the processor, cause the processor to determine, based on the data packet received from the remote vehicle, a path history for the remote vehicle, the path history including data points corresponding to a plurality of locations and headings including the first location and heading and one or more previous locations and headings. The memory can also store instructions to determine, using the determined path history, a geometry for a portion of the roadway preceding the remote vehicle.

DETAILED DESCRIPTION

This detailed description relates to the determination of one or more roadway features. The roadway features can include elevation changes, slope changes, curvature changes, to name a few examples. A data packet can be received from a remote vehicle. The data packet can include data corresponding to locations and headings of the remote vehicle. A path history for the remote vehicle can be determined based on the data packet. The path history can include data points corresponding to a plurality of locations and headings for the remote vehicle. A geometry for a portion of the roadway preceding the remote vehicle can be determined using the path history. The geometry for the portion of the roadway can include a curvature, rate of change of curvature, arc length, and/or other forms or mathematical representations of features of the roadway. The geometry for the portion of the roadway can be used to determine a driving maneuver for a different vehicle and/or to verify a map. Systems, methods, and computer program products that incorporate one or more of such features are described herein.

Figure 1:
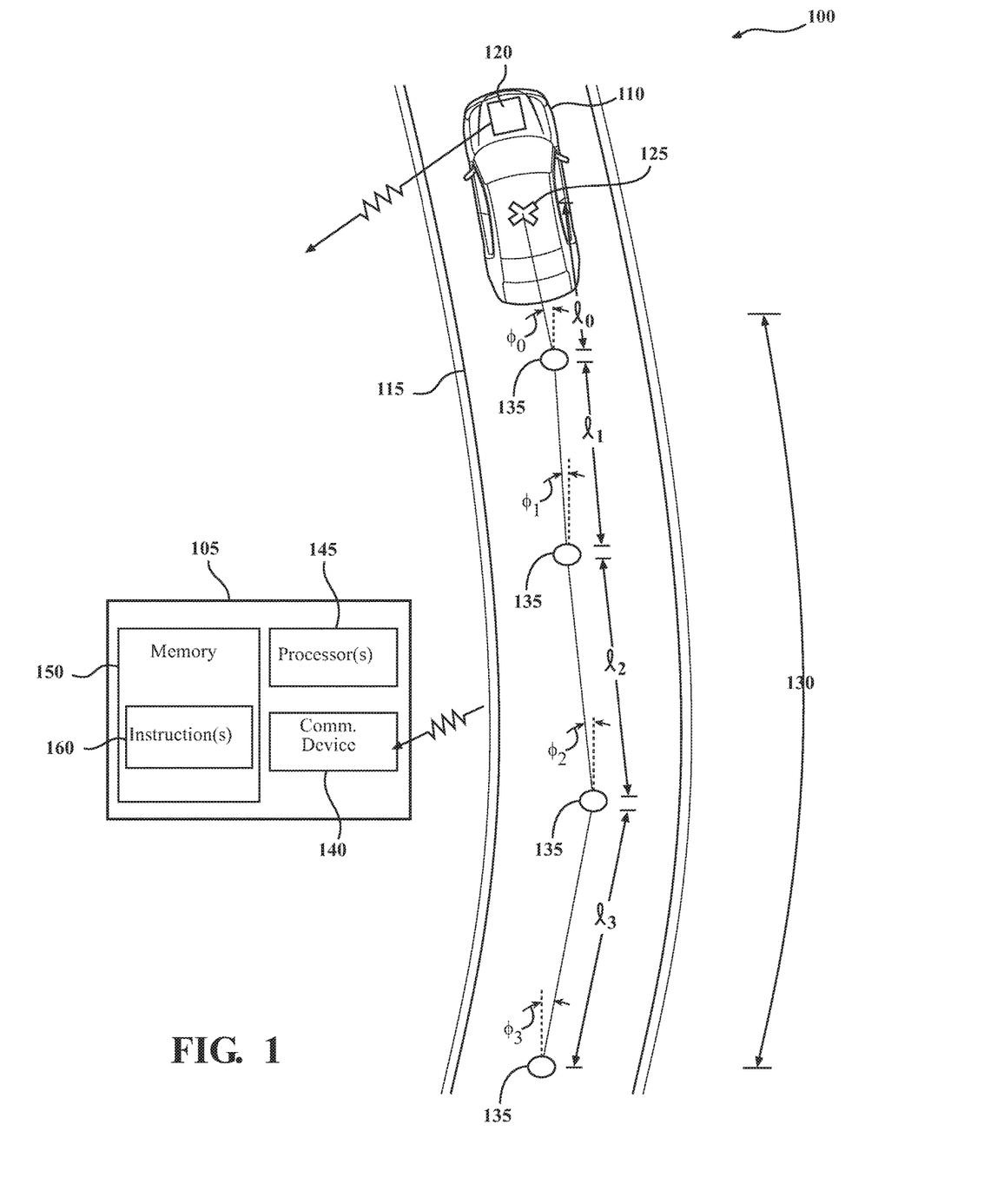
FIG. 1 is an example of a system for determining one or more roadway features.
Figure 2:
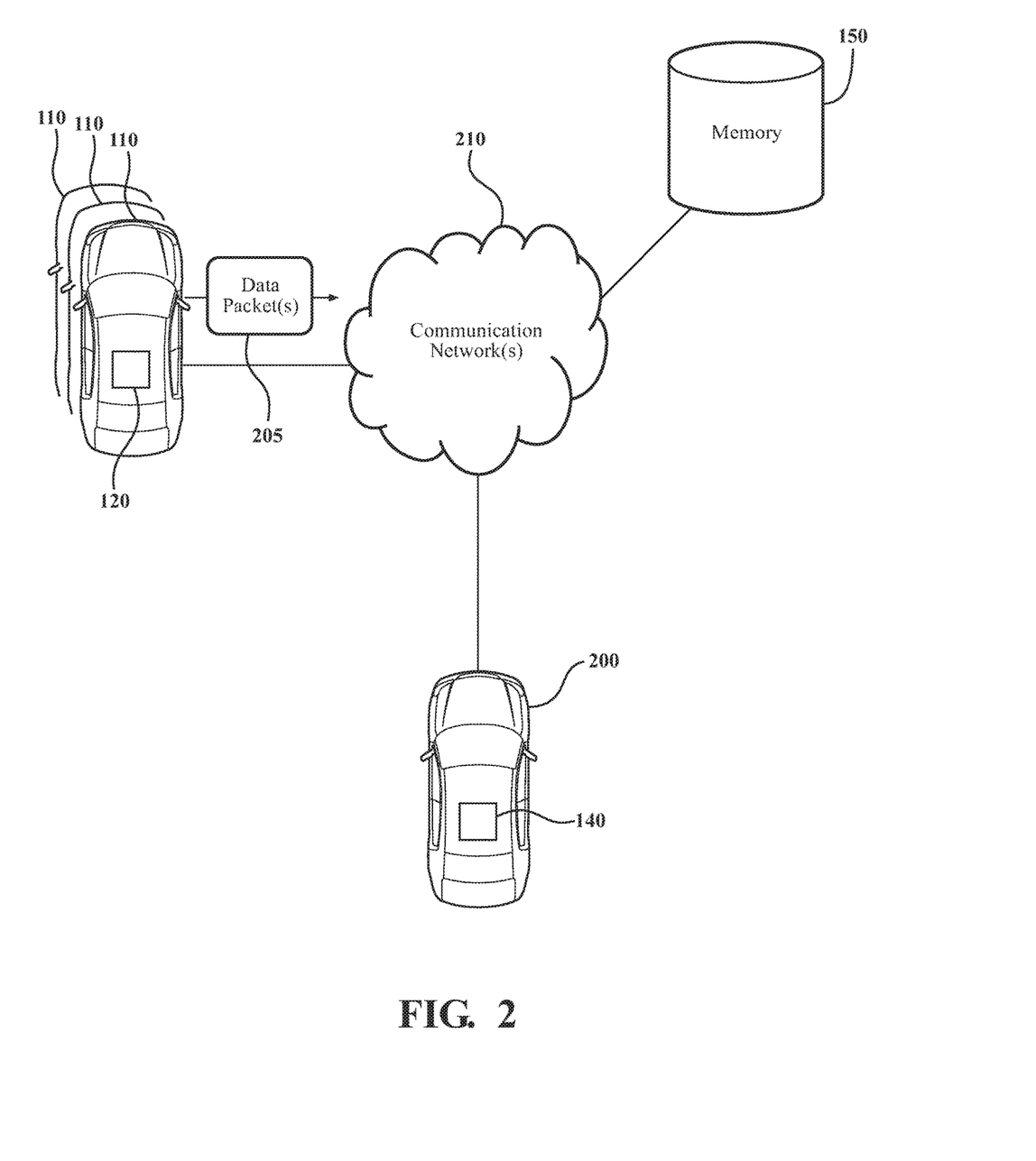
FIG. 2 is an example of a communications network between an ego vehicle and one or more remote vehicles.

Referring now to FIGS. 1 and 2, a system 100 is shown. The system 100 includes a computing system 105. In one or more arrangements, the computing system 105 can be an electronic computer. The system 100 can include a remote vehicle 110. As used herein, a "vehicle" is any form of motorized transport. In one or more implementations, the remote vehicle 110 can be an automobile. While arrangements will be described herein with respect to automobiles, it will be understood that examples are not limited to automobiles. As shown in FIG. 1, the remote vehicle 110 may be traveling on a roadway 115. The remote vehicle 110 can be remote from the computing system 105.

The remote vehicle 110 can include one or more sensors that are configured to capture, generate, and/or acquire data corresponding to one or more positions of the remote vehicle 110. In some examples, the sensor(s) can capture, generate, and/or acquire data corresponding to a location (e.g., a relative location, a global location, coordinates, etc.) of the remote vehicle 110, a heading (e.g., a relative heading, an absolute heading, etc.) of the remote vehicle 110, and/or a change in heading of the remote vehicle 110, just to name a few possibilities.

The remote vehicle 110 can include a vehicle communications device 120. The vehicle communications device 120 can communicate using any suitable communication technology. The vehicle communications device 120 can include an antenna, a receiver, a transmitter, and/or a transceiver that can be tuned to communicate according to various communications protocols. For instance, the vehicle communications device 120 can communicate via dedicated short range communications (DSRC) protocols. In one or more arrangements, the vehicle communications device 120 can communicate via a cellular network, Bluetooth, Wi-Fi, etc. In one or more arrangements, the vehicle communications device 120 can be, for example, a V2X-based (e.g., vehicle-tovehicle, vehicle-to-infrastructure, etc.) communications system. The vehicle communications device 120 can communicate via any wireless technology, now known or developed in the future.

The remote vehicle 110 can transmit, using the vehicle communications device 120, a data packet 205 (FIG. 2) to one or more remote locations, such as the computing system 105. "Data packet," as used herein, includes a collection of data that is transmitted together. In some arrangements, the data packet 205 can include current positional data 125 (e.g., at least, a current location and heading) of the remote vehicle 110. Additionally, in some arrangements, the data packet 205 can include a path history 130 for the remote vehicle 110. "Path history", as used herein, includes vehicle information captured at a series of two or more points 135 along a path at which the remote vehicle 110 was previously located (e.g., "breadcrumbs" at the remote vehicle's 110 past locations). As will be discussed in greater detail below, the computing system 105 can determine a geometry for a preceding portion of the roadway 115 for the remote vehicle 110 based on the received data packet 205. The "preceding portion" of the roadway 115 for the remote vehicle 110 can be a portion of the roadway 115 that the remote vehicle 110 has already traversed. In one or more arrangements, the remote vehicle 110 can transmit the data packet 205 according to SAE J2945/1. The remote vehicle 110 can transmit the data packet 205 periodically, irregularly, randomly, continuously, in response to a request or command, or in response to a condition or event.

In one or more arrangements, the computing system 105 can be a standalone device. In other arrangements, the computing system 105 can be implemented on or otherwise integrated into an ego vehicle 200, which will be described in greater detail later with reference to FIG. 3. In instances where the computing system 105 is not implemented on or otherwise integrated into the ego vehicle 200, however, the ego vehicle 200 can be a remote vehicle 110.

The computing system 105 can include a communications device 140. The communications device 140 can communicate using any suitable communication technology. The vehicle communications device 120 can include an antenna, a receiver, a transmitter, and/or a transceiver that can be tuned to communicate according to various communications protocols. For instance, the communications device 140 can communicate via, for example, dedicated short range communications (DSRC) protocols. In one or more arrangements, the communications device 140 can communicate via a cellular network, Bluetooth, Wi-Fi, etc. In one or more arrangements, the communications device 140 can be, for example, a V2X (e.g., vehicle-to-vehicle, vehicle-to-infrastructure, etc.) communications system. The communications device 140 can communicate via any wireless technology now known or developed in the future.

In one or more arrangements, the communications device 140 can be configured to communicate with the vehicle communications device 120. The communications device 140 can communicate with the vehicle communications device 120 via one or more communication networks 210, as is shown in FIG. 2. The communication network(s) 210 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 210 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network(s) 210 can include wired communication links and/or wireless communication links. The communication network(s) 210 can include any combination of the above networks and/or other types of networks.

In one or more arrangements, the computing system 105 can include one or more processors 145. The processor(s) 145 can include any component or group of components that are configured to execute, implement, and/or perform any of the processes or functions described herein or any form of instructions to carry out such processes or cause such processes to be performed. In one or more arrangements, the processor(s) 145 can be a main processor of the computing system 105. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 145 can include at least one hardware circuit (e.g., an integrated circuit) configured to carry out instructions contained in program code. In arrangements in which there is a plurality of processors, such processors can work independently from each other or one or more processors can work in combination with each other.

The computing system 105 can include memory 150 for storing one or more types of data. The memory 150 store can include volatile and/or non-volatile memory. Examples of suitable memory 150 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 150 can be a component of the processor(s) 145, or the memory 150 can be operatively connected to the processor(s) 145 for use thereby. The term "operatively connected," as used throughout this description, can include direct or indirect connections, including connections without direct physical contact. In some arrangements, the memory 150 can be located remotely from the computing system 105 and accessible by the computing system 105, such as via the communications device 140.

In one or more arrangements, the memory 150 can include various instructions 160 stored thereon. For example, the memory 150 can store computer-readable instructions 160 that, when executed by the processor(s) 145, cause the processor(s) 145 to perform the various functions disclosed herein. While functions performed by the processor(s) 145 may be described herein for purposes of brevity, it is noted that the functions are performed by the processor(s) 145 using the instructions 160 stored on memory 150. Some instructions 160 may be stored remotely and accessible by the processor(s) 145, such as via the communications device 140.

As will be described in greater detail below, the memory 150 can store instructions for determining a path history 130 for the remote vehicle 110. The memory 150 can store instructions for determining a geometry for a portion of the roadway 115 preceding the remote vehicle 110 based on the determined path history 130. The determined geometry can be used, for example, to validate an electronic map, to determine maneuvers/paths for other vehicles along the roadway 115, and/or for other suitable purposes.

Referring now to FIG. 2, at least a portion of the computing system 105 can be implemented on or otherwise integrated within an ego vehicle 200. The ego vehicle 200 can be any kind of vehicle including, but not limited to, an automobile.

In the example shown in FIG. 2, there are a plurality of remote vehicles 110 located in the environment. In this example, the remote vehicles 110 may be traveling on the same roadway 115 as each other. Additionally, the ego vehicle 200 may be traveling on the same roadway 115 as the remote vehicles 110. The ego vehicle 200 may be located on the roadway 115 behind one of the remote vehicles 110 relative to the travel direction of the ego vehicle 200.

Each of the remote vehicles 110 on the roadway 115 can transmit respective data packets 205 via the communication network(s) 210. Each remote vehicle 110 can include a respective vehicle communications device 120. As such, each remote vehicle 110 can communicate with the communication network(s) 210 via their respective vehicle communications device 120.

Additionally, the ego vehicle 200 can include a respective communications device 140. The ego vehicle 200 can receive the data packets 205 from the remote vehicles 110 using the communication device 140.

As shown in FIG. 2, at least a portion of the memory 150 can be stored remotely from the ego vehicle 200 and the remote vehicles 110. In this arrangement, at least a portion of the data stored on the memory 150 may be remotely accessible by the ego vehicle 200 and/or one or more of the remote vehicles 110 via the communication network(s) 210.

Figure 3:
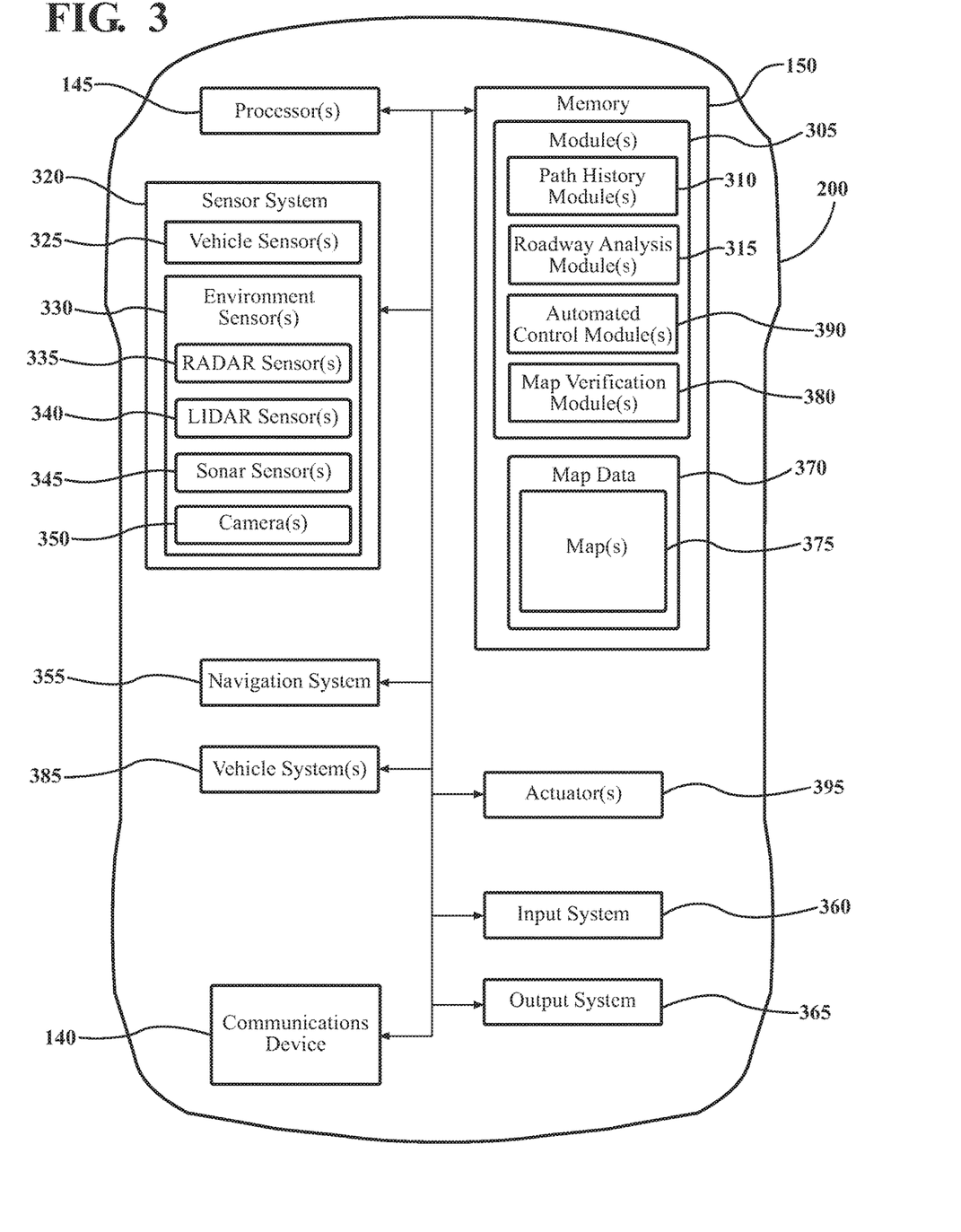
FIG. 3 is an example of an ego vehicle.

Referring now to FIG. 3, the ego vehicle 200 is shown in greater detail. The ego vehicle 200 can include various elements, including (but not limited to) those shown in FIG. 2. It will be understood that, in various examples, it may not be necessary for the ego vehicle 200 to have all of the elements described herein. The ego vehicle 200 can have any combination of the various elements described herein. Further, the ego vehicle 200 can have additional elements beyond those described herein. In some arrangements, the ego vehicle 200 can be implemented without one or more of the elements described herein. Further, while the various elements are described as being located within the ego vehicle 200, it will be understood that one or more of these elements can be located external to the ego vehicle 200. Further, the elements described herein may be physically separated by large distances.

As previously noted, in some instances, at least a portion of the computing system 105 can be integrated within or otherwise implemented on the ego vehicle 200. In this regard, the ego vehicle 200 can include the computing system 105 and elements associated therewith (e.g., those elements described above with respect to FIG. 1).

The ego vehicle 200 can include a navigation system 355. The navigation system 355 can include one or more devices, applications, and/or combinations thereof, now known or later developed, configured to determine the geographic location of the ego vehicle 200 and/or to determine a travel route for the ego vehicle 200. The navigation system 355 can include one or more mapping applications to determine a path for the ego vehicle 200. The navigation system 355 can include a global positioning system, a local positioning system, and/or a geolocation system. The navigation system 355 can be configured to determine a latitude, longitude, altitude, heading, velocity, yaw rate, etc. of the ego vehicle 200. In one or more arrangements, the data determined by the navigation system 355 may be used for path planning. In one or more arrangements, the data determined by the navigation system 355 may be used for other purposes, which will be discussed in greater detail below.

As stated above, the ego vehicle 200 can be configured to send data to and/or receive data (e.g., data packets 205) from one or more remote vehicles 110. In some examples, the remote vehicles 110 can be located forward of the ego vehicle 200 in the travel direction of the ego vehicle 200. More particularly, the remote vehicles 110 can be located forward of the ego vehicle 200 on a proceeding portion of the roadway 115 for the ego vehicle 200. The "proceeding portion" of the roadway 115 for the ego vehicle 200 can be a portion of the roadway 115 that is located ahead of the ego vehicle 200 in its travel direction. The ego vehicle 200 will traverse the proceeding portion of the roadway 115 in the near future while traveling on its path. In one or more arrangements, the data can include current positional data 125 for the one or more remote vehicles 110. The current positional data 125 can include, for example, a current location, heading, velocity, yaw rate, latitude, longitude, etc. Heading, as used herein, can include an orientation of a vehicle with respect to an axis (e.g., the longitudinal axis of the respective vehicle, the direction of travel for the vehicle along the road, etc.) Yaw rate, as used herein, can include a change or a rate of change in the heading. In one or more arrangements, the current positional data 125 can be generated by the one or more remote vehicles 110, and can be transmitted to the ego vehicle 200, such as via the vehicle communications device 120 through the communication network(s) 210 to the communications device 140.

In one or more arrangements, the memory 150 can store one or more modules 305. Modules 305 can be or include a set of computer-readable instructions that, when executed by the processor(s) 145, cause the processor(s) 145 to perform the various functions disclosed herein. While one or more modules 305 can be stored on memory 150, it should be noted the various modules 305 can be stored on and/or be a component of the processor(s) 145, can be remotely stored and accessible by the processor(s) 145, etc.

In one or more arrangements, one or more of the modules 305 described herein can include artificial or computational intelligence elements, e.g., neural network, fuzzy logic or other machine learning algorithms. Further, in one or more arrangements, one or more of the modules 305 can be distributed among a plurality of the modules 305 described herein. In one or more arrangements, two or more of the modules 305 described herein can be combined into a single module 305.

In one or more arrangements, the memory 150 can store one or more path history module(s) 310. The path history module(s) 310 can include instructions that, when executed by the processor(s) 145, cause the processor(s) 145 to determine a path history 130 for the remote vehicle 110. In some examples, the path history module(s) 310 can include instructions to determine a path history 130 for each of the remote vehicles 110 that are located in the environment of the ego vehicle 200. In other examples, the path history module(s) 310 can include instructions to determine a path history 130 for the remote vehicles 110 that have transmitted data packets 205 to the communication network(s) 210 and which have been received by the communications device 140. In still other examples, the path history module(s) 310 can include instructions to determine a path history 130 for those remote vehicles 110 located on the same roadway 115 as the ego vehicle 200 and, more particularly, those remote vehicle 110 that are located forward of the ego vehicle 200 in the travel direction of the ego vehicle 200.

The path history module(s) 310 can include instructions to determine the path history 130 for each of the remote vehicle(s) 110 based on the data packet 205 received from the remote vehicle(s) 110.

In one or more arrangements, the data packet 205 received from the remote vehicle(s) 110 can include path history data. The path history data can be a plurality of points 135 (FIG. 1) indicating the location and/or position data of the remote vehicle(s) 110 on a preceding path (e.g., a path that the remote vehicle 110 has already traversed). The path history data can include points 135 corresponding to the remote vehicle's 110 previous locations on the preceding path. The path history data can be a span across a duration of time and/or over a distance traveled by the remote vehicle 110 along the path. In this regard, each of the remote vehicle(s) 110 can transmit their respective path histories 130. In one or more arrangements, the path history data can include velocity, heading (see, e.g., $\phi_0, \phi_1, \phi_2, \phi_3$ in FIG. 1), yaw rate, latitude, longitude, etc. of the remote vehicle 110 at each point 135. Additionally, the path history data can include a time for each of the points in the path history 130. In one or more arrangements, the path history data can include other data, such as latitude, longitude, elevation, time, etc. of the remote vehicle 110 at each point 135. The path history data can be transmitted at any suitable time. For instance, the path history data can be transmitted periodically, irregularly, randomly, continuously, in response to a lateral movement, and/or in response to a request from the ego vehicle 200.

The data packet 205 can be used to generate a mathematical representation of a portion of the roadway 115 upon which the remote vehicle(s) 110 have already traveled or update a current mathematical representation of a portion of the roadway 115 upon which the remote vehicle(s) 110 have already traveled. More specifically, the data packet 205 can be used to generate mathematical representations of segments (see, e.g., $\ell_0, \ell_1, \ell_2, \ell_3$ in FIG. 1) between points 135 at which the remote vehicle 110 was known to be previously located (e.g., by data contained in the data packet 205) or update mathematical representations of segments between points 135 at which the remote vehicle 110 was known to be previously located (e.g., by data contained in the data packet 205). Segments, as used herein, are defined as the space between two data points representing ends of a portion of a roadway 115. As such, consecutive segments can represent consecutive portions of the road. Segments can be represented as piecewise polynomials, clothoids, etc. Therefore, the mathematical representation of each segments can define a geometry of the respective segment, and, collectively, a geometry of the roadway 115.

In some examples, each of remote vehicle(s) 110 can transmit a data packet 205 ($z_k^i$) that is expressed as follows:

$$z_k^i = [\bar{x}_k^{i,0}, \bar{y}_k^{i,0}, \bar{v}_k^{i,0}, \bar{\phi}_k^{i,0}, \bar{\psi}_k^{i,0} \ldots \bar{x}_k^{i,1}, \bar{y}_k^{i,1}, \bar{x}_k^{i,2}, \bar{y}_k^{i,2} \ldots \bar{x}_k^{i,M}, \bar{y}_k^{i,M}]^T \quad (1)$$

where x and y represent location points for the remote vehicle 110, $\bar{v}_k^{i,0}$ represents the current speed for the remote vehicle 110, $\bar{\phi}_k^{i,0}$ represents the current heading for the remote vehicle 110, and $\bar{\psi}_k^{i,0}$ represents the yaw rate for the remote vehicle 110. Note, variables with index 0 represent the information on the current location of the i-th remote vehicle, and the variables with indices 1-M represent the path history information (with M representing the number of data points in the path history 130 for the i-th remote vehicle 110). In these arrangements, it should be noted that the path history 130 does not include heading or yaw rate information for times 1-M. Therefore, the path history module(s) 310 can include instructions for determining, based on the location information for each of the remote vehicles 110, at least a heading and yaw rate for times 1-M.

In some examples, the path history module(s) 310 can include instructions for determining the heading and yaw rate for times 1-M by performing a measurement update. In some examples, the path history module(s) 310 can include instructions for performing the measurement update using the heading information of the i-th remote vehicle 110 as follows:

$$\tilde{\phi}_k^i = h^{dsrc}(s(r_k, \tilde{x}_k^i, \tilde{y}_k^i)) + w_k^{dsrc1} \quad (2)$$

where $\tilde{\phi}_k^i = [\tilde{\phi}_k^{i,1}, \tilde{\phi}_k^{i,2} \ldots \tilde{\phi}_k^{i,M'}]^T$ is an interpolated heading, $\tilde{x}_k^i = [\tilde{x}_k^{i,1}, \tilde{x}_k^{i,2} \ldots \tilde{x}_k^{i,M'}]^T, \tilde{y}_k^i = [\tilde{y}_k^{i,1}, \tilde{y}_k^{i,2} \ldots \tilde{y}_k^{i,M'}]^T$ represent positions of the remote vehicle 110 (which are used to update ($\tilde{\phi}_k^i$), and $r_k$, which is a road state vector, can be a collection of variables that define a shape of a portion of a roadway and can include a relative position of a vehicle (such as the ego vehicle 200) located thereon. Note that the road state vector will be discussed in greater detail below. The parameter M' represents the number of data points generated from the interpolation using, at least, a speed of the remote vehicle 110 (which can be provided within the data packet 205) and a length of the path history 130. The parameter $w_k^{dsrc1}$ represents Gaussian measurement noise with an M'×M' covariance matrix $R^{dsrc1}$. The function $s(r_k, \tilde{x}_k^{i,m}, \tilde{y}_k^{i,m})$ returns the arc length from the closest point on the roadway 115 to another point located at $\tilde{x}_k^{i,m}, \tilde{y}_k^{i,m}$, such that $$\{n, s(\tilde{x}_k^{i,m}, \tilde{y}_k^{i,m})\} = \underset{n,s}{\operatorname{argmin}} \sqrt{(x^n(s) - \tilde{x}_k^{i,m})^2 + (y^n(s) - \tilde{y}_k^{i,m})^2} \quad (3)$$

In equation (3), $x^n(s)$ and $y^n(s)$ are the coordinates at arc length s along the roadway 115 in the n-th segment where they can be approximated using a second order Taylor series expansion around $$s = \frac{l^n}{2}$$

as follows:

$$x^n(s) = x_0^n + A_1^n s + A_1^n s^2 + A_3^n s^3$$

$$y^n(s) = y_0^n + B_1^n s + B_2^n s^2 + B_3^n s^3$$

Where the coefficients $A_i^n$ and $B_i^n$ are $$A_1^n = C + \frac{1}{2} K S l^n - \frac{1}{8}(l^n)^2(c_1 S + K^2 C)$$

$$A_2^n = -\frac{1}{2} K S + \frac{1}{4} l^n (c_1 S + K^2 C)$$

$$A_3^n = -\frac{1}{6} l^n (c_1 S + K^2 C)$$

$$B_1^n = S - \frac{1}{2} K C l^n + \frac{1}{8}(l^n)^2(c_1 C - K^2 S)$$

$$B_2^n = \frac{1}{2} K C - \frac{1}{4} l^n (c_1 C - K^2 S)$$

-continued $$B_3^n = \frac{1}{6} l^n(c_1 C - K^2 S)$$

where $$C = \cos\left(\varphi^n\left(\frac{l^n}{2}\right)\right), S = \sin\left(\varphi^n\left(\frac{l^n}{2}\right)\right), \text{ and } K = c\left(\frac{l^n}{2}\right).$$

Note, $\varphi^n$ is the heading for the n-th segment (e.g., a segment extending between two consecutive points on the path history 130), and $l^n$ is the length of the n-th segment. Note, these parameters are shown in FIG. 1 for reference. Additionally, $c_n$ is the curvature of a segment, which may be assumed to change linearly with the distance, s, [i.e., the arc length] along the roadway 115. Accordingly, for a segment along the roadway 115 extending between two consecutive points on the path history, $c^n(s)=$where $c_0^n$ is the initial curvature and $c_1^n$ is the rate of change of curvature for the n-th segment.

Referring back to equation (2), $h^{dsrc}$ is a measurement update equation that provides the road headings at arc lengths $s(r_k, \tilde{x}_k^i, \tilde{y}_k^i)$ using equation (4) below:

$$\varphi^n(s) = \varphi_0^n + c_0^n s + \frac{1}{2} c_1^n s^2 \quad (4)$$

where $\varphi_0^n$ is the initial heading of the n-th segment. Accordingly, the heading for each point along the path history 130 can be calculated using equations (2)-(4). It is noted that $\varphi$ is used to represent the relative heading of segments of the roadway 115 in the local frame for the ego vehicle 200, and $\phi$ represents the heading of a remote vehicle 110 with respect to the local frame (i.e. the heading of the remote vehicle 110 relative to ego-vehicle's 200 heading). In some instances, it may be assumed that these headings are substantially the same. However, it is noted that $\phi$ may be a noisy measurement which is assumed to follow $\varphi$, and $\varphi$ is the variable that is to be estimated in equation (4). Note that, from the mathematical representation of the heading for a point along a path, the curvature and rate of change of curvature (e.g., yaw rate) can be determined by calculating the derivative and derivative of the derivative of the mathematical representation of the heading, respectively.

The above equations are provided merely as examples. It should be noted that there may be alternative methods of mathematically estimating heading of a vehicle from location points over time. Thus, the present disclosure is not limited to the above equations.

In one or more arrangements, the path history module(s) 310 can include instructions for generating additional data points along the path history 130. For example, the path history module(s) 310 can include instructions to generate additional data points along the path history 130 between two consecutive data points 135 that were received from a respective remote vehicle 110 via the data packet 205. The path history module(s) 310 and/or processor(s) 145 can be configured to assume that the roadway 115 exists between consecutive points 135 in the path history 130 and that the remote vehicle 110 corresponding to the path history 130 was located between the consecutive points on the roadway 115. Using such assumptions, the processor(s) 145 can interpolate additional data points along the path history 130.

By providing these assumptions and thereby generating additional data points along the path history 130, such an arrangement can increase reliability of the path history 130, and it can also increase the robustness of the road state vector for the ego vehicle 200, which will be discussed in greater detail below. It is noted that, in these arrangements, the collection of the path history 130 determined via the path history module(s) 310 and the additional data points that are interpolated between points 135 in the path history 130 are collectively referred to herein as the interpolated path history. In any arrangement, either the interpolated path history or the path history 130 can be used in the disclosed system/methods.

In some arrangements, the path history module(s) 310 can include instructions for analyzing the mathematically estimated heading for each of the location(s) in the path history 130. For example, the path history module(s) 310 can include instructions for comparing previously used headings in previous iterations to those calculated using equations (2)-(4). For example, where a remote vehicle 110 has transmitted a first data packet 205 that includes first path history data and a subsequent data packet 205 that includes subsequent path history data, the path history module(s) 310 can cross reference data from the subsequent data packet 205 to verify that no common data points exist between the first and subsequent data packet(s) 205. Where a match exists between data points (indicating that there are common data points between the first and subsequent data packet(s) 205), the path history module(s) 310 can remove the matching data points from the path history 130, thereby forming a modified path history (e.g., a path history that does not include common data points). Such an arrangement can mitigate any biasing of data points within the data packet 205 that may occur.

In one or more arrangements, the path history module(s) 310 can include instructions to store each of the data packets 205 received from the remote vehicle(s) 110. In this example, the path history module(s) 310 can include instructions to compile and store data packets 205 from the remote vehicle(s) 110 over time. The path history module(s) 310 can include instructions to generate, using the stored data packets 205 over time, a path history 130 for each of the remote vehicle(s) 110. In this regard, each of the data packets 205 received from the remote vehicle(s) 110 can include data corresponding to the current location and/or heading of the remote vehicle(s) 110 at the time the data packet 205 was received. Based on the current location and/or heading of the remote vehicle(s) 110 over time, the processor(s) 145 can generate a path history 130 for the remote vehicle(s) 110 using the instructions from the path history module(s) 310.

As stated above, the data packet 205 may be represented as shown in equation (1), which includes the current heading $\bar{\phi}_k^{i,0}$ and the current yaw rate $\bar{\psi}_k^{i,0}$ for the remote vehicle 110 at time 0. In this example, as the ego vehicle 200 receives data packets 205 over time, the path history module(s) 310 can include instructions to store and sequentially index the data packets 205 as they are received. In this regard, the path history module(s) 310 can include instructions for generating a path history 130 by saving heading and yaw rate information for the remote vehicle 110 over time. Accordingly, in this example, the measurement update equation can be written as shown in equation (5) below:

$$\bar{\phi}_k^i = h^{dsrc}(s(r_k, \bar{x}_k^i, \bar{y}_k^i)) + w_k^{dsrc2} \quad (5)$$

Where $\bar{\phi}_k^i, \bar{x}_k^i$, and $\bar{y}_k^i$ are the stored heading and position information of the i-th remote vehicle(s) 110 up to the current time k.

In both of these arrangements, the path history module(s) 310 can include instructions to determine the path history 130 for each of the remote vehicle(s) 110. In instances where the remote vehicle(s) 110 transmit path history data in the data packet, the path history module(s) 310 can include instructions for identifying the path history data within the data packet. In instances where the remote vehicle(s) 110 transmit the current location and/or positional data, the path history module(s) 310 can include instructions for generating the path history 130 from the transmitted current location and/or positional data from the remote vehicle(s) 110 over time. It is noted that, in both equation (2) and equation (5), the function $h^{dsrc}$ is used as a measurement update function that is used to describe how measurements that are generated by the remote vehicle(s) 110 are used to update a road state vector for a portion of the roadway 115 that spans at least some of the data points of the path history 130 for the remote vehicles 110, as will be described in greater detail below.

The memory 150 can store one or more roadway analysis modules 315. The roadway analysis module(s) 315 can include instructions for maintaining a road state vector for a portion of the roadway 115 ahead of the ego vehicle 200 (e.g., a proceeding portion of the roadway 115). The road state vector can be a collection of variables that define a shape of a portion of a roadway and can include a relative position of a vehicle (such as the ego vehicle 200) located thereon. In some examples, the road state vector can be expressed according to equation (6), as follows:

$$r_k = [y_k^{off}, \varphi^n, c_{0,k}, c_{1,k}^1, \ldots c_{1,k}^N]^T \quad (6)$$

where $y_k^{off}$ is the lateral offset from the ego vehicle 200 at time k and the center of its lane, $\varphi^n$ is the heading of the starting point of the road relative to the ego vehicle 200. The remaining variables, $c_{0,k}, c_{1,k}^1, \ldots c_{1,k}^N$, represent the initial curvature and rate of change of curvature for each of the segments for the roadway 115 which is being represented by the road state vector described in equation (6).

The roadway analysis module(s) 315 can include instructions for updating the road state vector for the ego vehicle 200 as the ego vehicle 200 receives subsequent data packets 205 transmitted from the remote vehicle(s) 110. The roadway analysis module(s) 315 can include instructions for updating the road state vector using the calculations performed using the instructions from the path history module(s) 310. In some examples, the roadway analysis module(s) 315 can include instructions to use at least some of the calculations performed via the path history module(s) 310 for updating the road state vector. For example, the roadway analysis module(s) 315 can include instructions to use the calculations performed via the path history module(s) 310 (e.g., the calculations and/or determinations of the location points $(x_k^{i,m}, y_k^{i,m})$ and heading $(\phi_k^{i,m})$ of each of the remote vehicle(s) 110) to transform the respective location points and headings to the local Cartesian coordinate system that is maintained for the ego vehicle 200 (for example, with the y-axis being defined by the longitudinal axis of the ego vehicle 200, and the x-axis being a lateral axis of the ego vehicle 200 that is offset 90° from the longitudinal axis). In this regard, the roadway analysis module(s) 315 can include instructions to use the measurement function shown in equations (2) and (5) for updating the road state vector attached to the ego vehicle 200.

In some arrangements, the roadway analysis module(s) 315 can include instructions for updating the road state vector using a filter. For example, the roadway analysis module(s) 315 can include instructions to update the road state vector using a Kalman filter, such as an Unscented Kalman filter, Cubature Kalman filter, etc. In this regard, the roadway analysis module(s) 315 can include instructions for reflecting changes in the road state vector as the ego vehicle 200 moves through the environment and along the roadway 115.

Referring now to FIG. 3, the ego vehicle 200 can include a sensor system 320. The sensor system 320 can include one or more sensors. "Sensor" means any device, component and/or system that can detect, determine, assess, monitor, measure, quantify and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 320 includes a plurality of sensors, the sensors can work independently from each other. Alternatively, two or more of the sensors can work in combination with each other. In such case, the two or more sensors can form a sensor network. The sensor system 320 and/or the one or more sensors can be operatively connected to the processor(s) 145, the memory 150, and/or another element of the ego vehicle 200. As will be understood below, the sensor system 320 can be used by the processor(s) 145 and/or other elements of the ego vehicle 200 to perform various functions.

The sensor system 320 can include any suitable type of sensor(s). Various examples of different types of sensors will be described herein. However, it will be understood that the examples are not limited to the particular sensors described. The sensor system 320 can include one or more vehicle sensors 325. The vehicle sensor(s) 325 can detect, determine, and/or sense information about the ego vehicle 200 itself. In one or more arrangements, the vehicle sensor(s) 325 can be configured to detect, and/or sense position and orientation changes of the ego vehicle 200, such as, for example, based on inertial acceleration. In one or more arrangements, the vehicle sensor(s) 325 can include one or more accelerometers, one or more gyroscopes, an inertial measurement unit (IMU), a dead-reckoning system, a global navigation satellite system (GNSS), a global positioning system (GPS), a navigation system 355, and/or other suitable sensors. The vehicle sensor(s) 325 can be configured to detect, and/or sense one or more characteristics of the ego vehicle 200. In one or more arrangements, the vehicle sensor(s) 325 can include a speedometer to determine a current speed of the ego vehicle 200. In one or more arrangements, the vehicle sensor(s) 325 can include a yaw rate sensor.

Alternatively, or in addition, the sensor system 320 can include one or more environment sensors 330 configured to acquire, and/or sense driving environment data. "Driving environment data" includes and data or information about the external environment in which a vehicle is located or one or more portions thereof. For example, the one or more environment sensors 330 can be configured to detect, quantify and/or sense objects in at least a portion of the external environment of the ego vehicle 200 and/or information/data about such objects. Such objects can be stationary objects and/or dynamic objects. Further, the one or more environment sensors 330 can be configured to detect, measure, quantify and/or sense other things in the external environment of the ego vehicle 200, such as, for example, lane markers, signs, traffic lights, traffic signs, lane lines, crosswalks, curbs proximate the ego vehicle 200, off-road objects, etc.

Various examples of sensors of the sensor system 320 will be described herein. The example sensors can be part of the one or more environment sensors and/or the one or more vehicle sensors. However, it will be understood that the examples are not limited to the particular sensors described. Furthermore, while examples provided herein are described as sensors that are incorporated on or otherwise integrated within the ego vehicle 200, in instances where the computing system 105 is a standalone or roadside device, one or more sensors of the sensor system 320 can be positioned alongside the roadway 115.

As an example, in one or more arrangements, the sensor system 320 can include one or more radar sensors 335, one or more LIDAR sensors 340, one or more sonar sensors 345, one or more ranging sensors, and/or one or more cameras 350. In one or more arrangements, the one or more cameras can be high dynamic range (HDR) cameras or infrared (IR) cameras.

In one or more arrangements, the roadway analysis module(s) 315 can include instructions for modifying the road state vector of the ego vehicle 200 according to the path history 130 as determined via the path history module(s) 310 and one or more additional inputs. For instance, the roadway analysis module(s) 315 can include instructions for modifying the road state vector according to the path history 130 and sensor inputs. The sensor inputs can include, for example, camera inputs from the camera(s) 350, radar/LIDAR/sonar etc. inputs from the radar sensor(s) 335, LIDAR sensor(s) 340, sonar sensor(s) 345, etc., or other sensors of the ego vehicle 200 (e.g., positioning sensors, speed/yaw rate sensors, etc.). Each of these inputs can have associated measurement update functions that are similar to those described above with reference to the path history 130 measurement update functions.

The roadway analysis module(s) 315 can include instructions for modifying the road state vector according to the measurement update functions for the path history 130 as determined via the path history module(s) 310 as well as the measurement update functions of the sensor inputs. In some examples, respective measurement update functions may be weighted differently according to their reliability. The roadway analysis module(s) 315 can include instructions for updating the road state vector for the roadway 115 according to at least some of these inputs.

Although described in general herein, in one or more arrangements, the roadway analysis module(s) 315 can be configured to analyze the data and determine one or more geometric features about the road in any suitable manner, now known or later developed. The geometric features determined by the roadway analysis module(s) 315 can be used for several purposes, including but not limited to map verification, path planning for the ego vehicle 200, etc.

Although described in general herein, in one or more arrangements, the roadway analysis modlue(s) 315 can be configured to analyze the data and determine one or more geometric features about the road in any suitable manner, including in a manner similar to what is disclosed in "V2V and On-Board Sensor Fusion for Road Geometry Estimation", which is incorporated by reference herein in its entirety. The geometric features determined by the roadway analysis modlue(s) 315 can be used for several purposes, including but not limited to map verification, path planning for the ego vehicle 200, etc.

In one or more arrangements, the memory 150 can include map data 370. The map data 370 can include one or more maps 375 of one or more geographic areas. In some instances, the map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360-degree ground views. The map data can include measurements, dimensions, distances, and/or information for one or more items included in the map data and/or relative to other items included in the map data. For instance, the map data can include measurements, dimensions, distances, and/or information about one or more roads. The map data can include a digital map with information about road geometry. The map data can be high quality and/or highly detailed.

In one or more arrangements, the map(s) 375 can include one or more terrain maps. The terrain map(s) can include information about the ground, terrain, roads, surfaces, and/or other features of one or more geographic areas. The terrain map(s) can include elevation data in the one or more geographic areas. The map data can be high quality and/or highly detailed. The terrain map(s) can define one or more ground surfaces, which can include paved roads, unpaved roads, land, and other things that define a ground surface.

In one or more arrangements, the map(s) 375 can include one or more static object maps. The static object map(s) can include information about one or more static objects located within one or more geographic areas. A "static object" is a physical object whose position does not change or substantially change over a period of time and/or whose size does not change or substantially change over a period of time. Examples of static objects include trees, buildings, curbs, fences, railings, medians, utility poles, statues, monuments, signs, benches, furniture, mailboxes, large rocks, hills. The static objects can be objects that extend above ground level. The one or more static objects included in the static object map(s) can have location data, size data, dimension data, material data, and/or other data associated with it. The static object map(s) can include measurements, dimensions, distances, and/or information for one or more static objects. The static object map(s) can be high quality and/or highly detailed. The static object map(s) can be updated to reflect changes within a mapped area.

In one or more arrangements, the map(s) 375 can include road state vector(s) associated with various spans of a roadway 115. For example, the map(s), terrain map(s) and/or the static object map(s) can include a road state vector associated with the roadway 115 upon which the remote vehicles 110 are currently traversing. Accordingly, the map(s) 375 can include a road state vector that corresponds to a digital road geometry for the roadway 115.

The memory 150 can store one or more map verification modules 380. In one or more arrangements, the map verification module(s) 380 can include instructions to compare the determined geometry of a portion of the roadway (as determined via the roadway analysis module(s) 315) to the digital road geometry included in the map(s) 375. In one or more arrangements, the map verification module(s) 380 can include instructions to compare the road state vector determined by the roadway analysis module(s) 315 to the road state vector included in the map(s) 375.

In some examples, the map verification module(s) 380 can determine a starting location of the roadway 115 (e.g., $(x_0, y_0)$) associated with the road state vector maintained via the roadway analysis module(s) 315 and, based on the starting location, identify a road state vector stored on memory 150 and associated with the starting location. The map verification module(s) 380 can include instructions to compare the respective road state vectors.

Based on the comparison, the map verification module(s) 380 can verify the accuracy of the digital road geometry of the map(s) 375 (e.g., when the respective road state vectors substantially match). Additionally, the map verification module(s) 380 can indicate or otherwise generate an alert where a discrepancy between the determined geometry and the digital road geometry. "Substantially match" means identical or within a predetermined probability (e.g., at least about 85%, at least about 90%, at least about 95% or greater) or predetermined confidence level. If the road curvature and/or the road geometry in the map(s) 375 in the memory 150 substantially matches the determined road curvature and/or the road geometry, then the map(s) 375 in the memory 150 can be verified. The ego vehicle 200 can continue to use the verified map(s) 375.

However, if the digital road geometry in the map(s) 375 do not substantially match the determined geometry for the roadway 115, it can be indicative that the map(s) 375 are not accurate. In one or more arrangements, responsive to determining that there is not a substantial match, the map verification module(s) 380 can include instructions to update the map(s) 375, cause the map(s) 375 to be updated, and/or send a command or request to update and/or review the map(s) 375. In one or more arrangements, the command can be a command to update the map(s) 375 by using the geometry determined via the roadway analysis module(s) 315. The command can be implemented automatically so that the map(s) 375 can be updated in real-time, or the command can be implemented at any suitable time and/or with respect to one or more predetermined conditions (e.g., approval by a vehicle occupant or other entity, a predetermined number of such commands for the same location, etc.). In one or more arrangements, responsive to determining that the digital road geometry in the map(s) 375 does not match the determined road geometry, the map verification module(s) 380 can disable, filter, ignore, and/or delete the map(s) 375 for at least some purposes (for example, automated driving, advanced driving assistance systems, etc.). Such actions can be performed automatically or by approval by a vehicle occupant or other entity. An alert can be provided to a vehicle occupant to indicate that the map 375 for the area in which the ego vehicle 200 is currently located is not available.

The ego vehicle 200 can include an input system 360. An "input system" includes any device, component, system, element or arrangement or groups thereof that enable information/data to be entered into a machine. The input system 360 can be configured to receive an input from a vehicle occupant (e.g. a driver or a passenger). Any suitable input system 360 can be used, including, for example, a keypad, display, touch screen, multi-touch screen, button, joystick, mouse, trackball, microphone and/or combinations thereof.

The ego vehicle 200 can include an output system 365. An "output system" includes any device, component, system, element or arrangement or groups thereof that enable information/data to be presented to a vehicle occupant (e.g. a person, a vehicle occupant, etc.). The output system 365 can be configured to present information/data to a vehicle occupant. The output system 365 can include a display. Alternatively, or in addition, the output system 365 may include an earphone and/or speaker. Some components of the ego vehicle 200 may serve as both a component of the input system 360 and a component of the output system 365.

The ego vehicle 200 can include one or more vehicle systems 385. Various examples of the one or more vehicle systems 385 are described herein. However, the ego vehicle 200 can include more, fewer, or different vehicle systems 385. It should be appreciated that although particular vehicle systems 385 are separately defined, each or any of the systems or portions thereof can be otherwise combined or segregated via hardware and/or software within the ego vehicle 200. The ego vehicle 200 can include a propulsion system, a braking system, a steering system, throttle system, a transmission system, a signaling system, and/or a navigation system 355. Each of these systems can include one or more devices, components, and/or combination thereof, now known or later developed.

In one or more arrangements, the ego vehicle 200 can be a conventional vehicle that is configured to operate in only a manual mode. "Manual mode" means that all of or a majority of the navigation and/or maneuvering of the ego vehicle 200 is performed according to inputs received from a user (e.g., human driver).

In one or more examples, the ego vehicle 200 can be an autonomous vehicle. As used herein, "autonomous vehicle" refers to a vehicle that operates in an autonomous mode. "Autonomous mode" means one or more computing systems are used to navigate, maneuver, and/or control the ego vehicle 200 along a travel route or path with minimal or no input from a human driver. In one or more examples, the ego vehicle 200 can be highly automated or completely automated. In one or more arrangements, the ego vehicle 200 can be configured with one or more semi-autonomous modes in which one or more computing systems perform a portion of the navigation and/or maneuvering of the ego vehicle 200 along a travel route, and a vehicle operator (i.e., a human driver) provides inputs to the ego vehicle 200 to perform a portion of the navigation and/or maneuvering of the ego vehicle 200. In one or more arrangements, the ego vehicle 200 is configured one or more semi-autonomous operational modes in which one or more computing systems control one or more components of the ego vehicle 200 to cause the ego vehicle 200 to follow a modified path deviating from the current path being followed by the human driver. In this example, the one or more computing systems control one or more components of the ego vehicle 200 to cause the ego vehicle 200 to follow a modified path responsive to determining a deviation from the current path being followed by the human driver.

The ego vehicle 200 can have one or more semi-autonomous operational modes in which a portion of the navigation and/or maneuvering of the ego vehicle 200 along a travel route is performed by one or more computing systems, and a portion of the navigation and/or maneuvering of the ego vehicle 200 along a travel route is performed by a human driver. One example of a semi-autonomous operational mode is when an adaptive cruise control system is activated. In such case, the speed of the vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

In some instances, the ego vehicle 200 can be configured to selectively switch between various operational modes (e.g., an autonomous mode, one or more semi-autonomous modes, and/or a manual mode). Such switching can be implemented in a suitable manner, now known or later developed. The switching can be performed automatically, selectively, or it can be done responsive to receiving a manual input or request.

The ego vehicle 200 can include one or more automated control modules 390. The automated control module(s) 390 can include instructions to communicate with the various vehicle systems. In one or more arrangements, the processor(s) 145 can be operatively connected to communicate with the various vehicle systems and/or individual components thereof according to, at least in part, instructions included on the automated control module(s) 390. For example, the processor(s) 145 can be in communication to send and/or receive information from the various vehicle systems to control the movement, speed, maneuvering, heading, direction, etc. of the ego vehicle 200. The processor(s) 145 can control some or all of these vehicle systems and, thus, the ego vehicle 200 can be partially or fully autonomous.

The processor(s) 145 can be operable to control the navigation and/or maneuvering of the ego vehicle 200 by controlling one or more of the ego vehicle 200 systems and/or components thereof. For instance, when operating in an autonomous or semi-autonomous mode, the processor(s) 145 can control the direction and/or speed of the ego vehicle 200 based, at least in part, on instructions stored on the automated control module(s) 390. The automated control module(s) 390 can include instructions that cause the ego vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The ego vehicle 200 can include one or more actuators 395. The actuators 395 can be any element or combination of elements operable to modify, adjust and/or alter one or more of the ego vehicle 200 systems or components thereof responsive to receiving signals or other inputs from the processor(s) 145, the automated control module(s) 390, and/or other module(s). Any suitable actuator can be used. For instance, the one or more actuators 395 can include motors, pneumatic actuators, hydraulic pistons, relays, solenoids, and/or piezoelectric actuators, just to name a few possibilities.

In one or more arrangements, the automated control module(s) 390 can be configured to receive data from the sensor system 320 and/or any other type of system capable of capturing information relating to the ego vehicle 200 and/or the external environment of the ego vehicle 200. In one or more arrangements, the automated control module(s) 390 can use such data to generate one or more driving scene models. The automated control module(s) 390 can determine position and velocity of the ego vehicle 200. The automated control module(s) 390 can determine the location of objects, objects, or other environmental features including traffic signs, trees, shrubs, neighboring vehicles, pedestrians, etc.

The automated control module(s) 390 can include instructions to receive, and/or determine location information for objects (e.g., the ego vehicle 200) within the external environment of the ego vehicle 200 for use by the processor(s) 145, and/or one or more of the modules described herein to determine position and orientation of the ego vehicle 200, vehicle position in global coordinates based on signals from a plurality of satellites, or any other data and/or signals that could be used to determine the current state of the ego vehicle 200 or determine the position of the ego vehicle 200 with respect to its environment for use in either creating a map or determining the position of the ego vehicle 200 in respect to map data.

The automated control module(s) 390 can include instructions to determine path(s), current autonomous driving maneuvers for the ego vehicle 200, future autonomous driving maneuvers and/or modifications to current autonomous driving maneuvers based on data acquired by the sensor system 320, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle, changing travel lanes, merging into a travel lane, and/or reversing, just to name a few possibilities. The automated control module(s) 390 can include instructions to cause, directly or indirectly, such autonomous driving maneuvers to be implemented. The automated control module(s) 390 can include instructions to execute various vehicle functions and/or to transmit data to, receive data from, interact with, and/or control the vehicle or one or more systems thereof (e.g. one or more of vehicle systems).

In one or more arrangements, the automated control module(s) 390 can include instructions to use data corresponding to the upcoming portion of the roadway 115 for the ego vehicle 200 (the proceeding path) to determine the path for the ego vehicle 200 to follow. The data received from the roadway analysis module(s) 315 can correspond to the road state vector for the proceeding portion of the roadway 115 with respect to the ego vehicle 200. The automated control module(s) 390 can determine the path for the ego vehicle 200 to follow according to the road state vector. According to arrangements described herein, the ego vehicle 200 can be configured to generate a path for the ego vehicle 200 to follow. In one or more arrangements, the path can be defined by one or more driving maneuvers. However, alternatively or in addition, the path can be defined in any other suitable manner. The generation of the path can be based at least partially on the determined road curvature and/or the determined road geometry as defined by, at least, the road state vector. In one or more arrangements, the path can be defined at least partially by one or more driving maneuvers. Such driving maneuvers can include a movement in the lateral direction and/or the longitudinal direction of the vehicle. When the ego vehicle 200 is an autonomous vehicle or operating in an autonomous mode, the vehicle can be caused to implement the determined path.

When the ego vehicle 200 is a semi-autonomous vehicle, various controls/alerts can be implemented according to the determined road curvature and/or determined road geometry as defined by the road state vector. For instance, the determined road curvature and/or the determined road geometry can be used for detecting a lane departure of the ego vehicle 200. In this example, where the ego vehicle 200 includes lane keeping capabilities, the automated control module(s) 390 can include instructions to center the vehicle based on the determined road curvature and/or the determined road geometry. Alternatively, where the ego vehicle 200 includes lane departure warning capabilities, the automated control module(s) 390 can include instructions to alert a driver of the lane departure based on the determined road curvature and/or the determined road geometry.

As another example, the automated control module(s) 390 can include instructions for determining, based on the determined road curvature and/or the determined road geometry, that a bend in the road is upcoming. In one or more arrangements, the automated control module(s) 390 can include instructions to slow (or provide an alert for the driver to slow) the ego vehicle 200 as the ego vehicle 200 approaches the curve.

While the previous examples have been provided, the present disclosure is not limited to these examples. To the contrary, it should be appreciated that the disclosed systems can be used for performing many functions.

Figure 4:
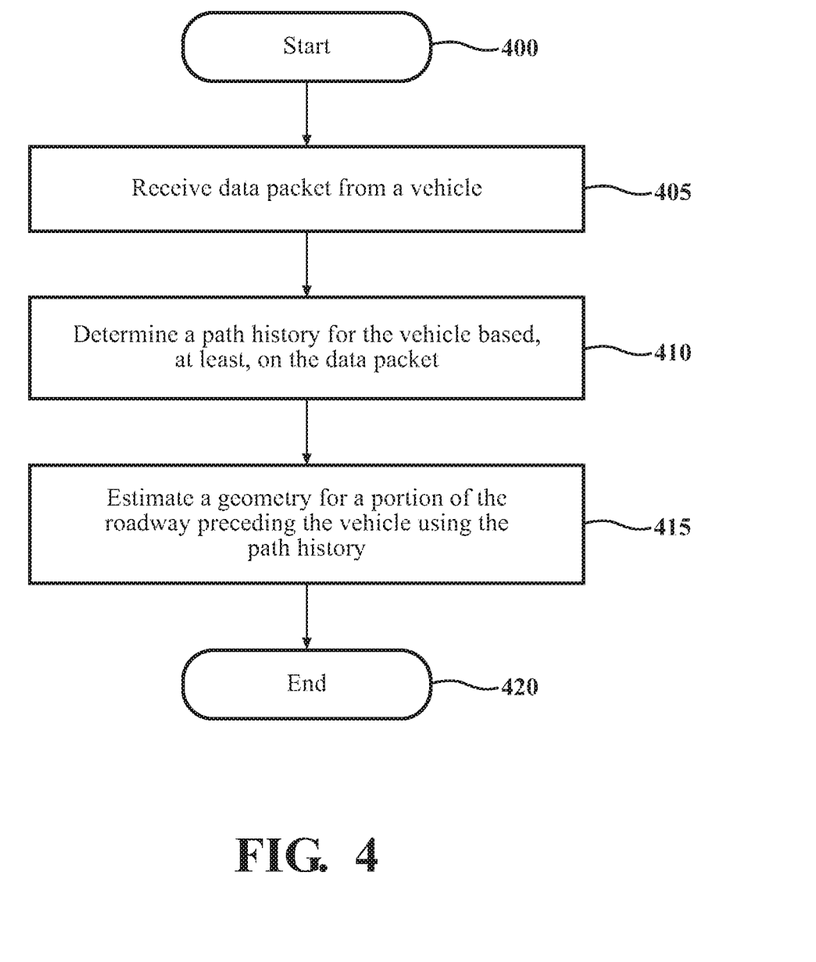
FIG. 4 is an example of a method for determining one or more roadway features.

Now that various systems have been disclosed, a method of determining one or more roadway features will now be described with reference to FIG. 4. The methods described may be applicable to the arrangements described above in relation to FIGS. 1-3, but it is understood that the methods can be carried out with other suitable systems and arrangements. Although various steps of the method will be described herein, it should be noted that the method is not limited to each and every described step. To the contrary, the method can include additional steps, fewer steps, and/or different/modified steps. Further, the method is not be limited to any particular chronological order. Indeed, some of the blocks may be performed in a different order than what is shown and/or at least some of the blocks shown can occur simultaneously.

The method can begin at starting block 400. The communication network(s) 210 can be active. The computing system 105, the remote vehicle(s) 110, and/or the ego vehicle 200 can be turned on/activated, etc. The method can proceed to function block 405.

At function block 405, the computing system 105 can receive, from a remote vehicle 110, a data packet 205. As described above, the data packet 205 can include current positional data 125 for the remote vehicle 110. The current positional data 125 can include a first location and heading of the remote vehicle 110. In some arrangements, the data packet 205 can also include path history data.

As previously noted, the computing system 105 can be implemented on the ego vehicle 200, or it can be a stand-alone device. The method can proceed to function block 410.

At function block 410, a path history 130 for the remote vehicle 110 can be determined based on the data packet 205 received from the remote vehicle 110. Such a determination can be made by the processor(s) 145 using instructions from the path history module(s) 310 and/or other module(s). As described above, the path history 130 can include a plurality of points 135 corresponding to a plurality of locations and headings of the remote vehicle 110 including the first location and heading and one or more previous locations and headings. In some instances, the processor(s) 145 can store previous data packets 205 received from the remote vehicle 110. In these instances, the processor(s) 145 can re-use the previous data packets 205 to form a path history 130 for the remote vehicle 110. In other instances, the data packet 205 received from the remote vehicle 110 may include path history data. In these instances, the processor(s) 145 can identity the path history data within the data packet 205.

In one or more arrangements, one or more headings and/or one or more other parameters associated with the remote vehicle 110 at different locations within the path history 130 can be determined based on the path history 130 determined at function block 410. Such a determination can be made by the processor(s) 145, using instructions from the path history module(s) 310 and/or other module(s). For example, the processor(s) 145 can mathematically calculate the heading, curvature, yaw rate, etc. according to equations (2)-(5) provided above. The method can proceed to function block 415.

At function block 415, a geometry for a portion of the roadway 115 preceding the remote vehicle 110 using the path history 130 can be determined. Such a determination can be made by the processor(s) 145 using instructions from the roadway analysis module(s) 315 and/or other module(s). The geometry can be defined by the road state vector for the portion of the roadway 115 preceding the remote vehicle 110. In some arrangements, the processor(s) 145 can determine the geometry for the portion of the roadway 115 using the path history 130 and one or more sensor inputs as described above.

In one or more arrangements, the processor(s) 145 can, using instructions from the map verification module(s) 380, determine whether a discrepancy exists between the geometry determined at function block 415 and a geometry stored on memory 150 as map data. The processor(s) 145 can verify or update the map data according to a comparison of the respective geometries.

In one or more arrangements, the processor(s) 145 can determine, using instructions from the automated control module(s) 390 one or more driving assistance function and/or one or more driving maneuvers based on the geometry determined at function block 415. For example, where the computing system 105 is implemented on the ego vehicle 200, the processor(s) 145 can determine whether there is a bend in the roadway 115 or whether the ego vehicle 200 is departing its lane based on the determined geometry as compared to a current location of the ego vehicle 200. The processor(s) 145 can cause the ego vehicle 200 to slow down as it approaches the bend, cause the ego vehicle 200 to center within the lane, etc. In other arrangements, the processor(s) 145 can cause an alert to be provided to direct a driver to slow the ego vehicle 200 down, center the ego vehicle 200 within the lane, etc.

The method can proceed to ending block 420. The method can end when the communication network(s) 210 are deactivated, when any one of the computing system 105, vehicle(s) 110, 200, etc. are turned off/deactivated, etc.

The following example is provided for purposes of summarizing one environment in which the systems/methods disclosed herein can operate. However, it should be noted that the present disclosure is not limited to this example.

The ego vehicle 200 may be driving along the roadway 115. Additionally, two remote vehicles 110 may be driving along the same roadway 115 and may be located ahead of the ego vehicle 200 in the travel direction of the ego vehicle 200. Each of the remote vehicles 110 can transmit a respective data packet 205, either directly or indirectly, to the ego vehicle 200. The ego vehicle 200 can use the data packet 205 to determine a path history 130 for each of the remote vehicles 110. The path history 130 for each remote vehicle 110 can span at least a portion of the space between the ego vehicle 200 and each of the remote vehicles 110. Each path history 130 can be used to update a road state vector stored by the ego vehicle 200 and corresponding to the portion of the roadway 115 proceeding the ego vehicle 200 (e.g., the portion of the roadway 115 between the ego vehicle 200 and the remote vehicles 110). In this regard, the ego vehicle 200 uses data from the remote vehicle 110 to update the ego vehicle's 200 understanding of the upcoming portion of the roadway 115. The ego vehicle 200 can use this understanding to perform various autonomous, semi-autonomous, and/or driver assistance functions. Additionally or alternatively, the ego vehicle 200 can use this understanding to verify the map(s) 375 associated with the upcoming portion of the roadway 115.

It will be appreciated that arrangements described herein can provide numerous benefits, including one or more of the benefits mentioned herein. For example, arrangements described herein can increase the robustness of a vehicle's understanding of a roadway. Arrangements described herein can provide additional feedback to a vehicle for decision-making. Arrangements described herein can provide more efficient ways of updating electronically stored information.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof.

What is claimed is:

1. A method of determining one or more features of a roadway, the method comprising:
   receiving a data packet from a remote vehicle, the data packet including data corresponding to a first location and a first heading of the remote vehicle;
   based on the data packet received from the remote vehicle, determining, using one or more processors, a path history for the remote vehicle, the path history including data points corresponding to a plurality of locations and headings including the first location and the first heading and one or more previous locations and previous headings of the remote vehicle; and
   determining, using one or more processors, a geometry for a portion of the roadway preceding the remote vehicle based on the determined path history.

2. The method in claim 1, wherein determining the geometry comprises:
using the path history for the remote vehicle and data corresponding to the remote vehicle and acquired by one or more sensors, determining, using one or more processors, the geometry for the portion of the roadway preceding the remote vehicle.

3. The method of claim 2, wherein the one or more sensors are located along the roadway.

4. The method of claim 1, wherein the path history is a first path history, and wherein the method further comprises:
receiving a subsequent data packet from the remote vehicle including a subsequent location and a subsequent heading of the remote vehicle and data points for a subsequent path history;
determining, based on the subsequent path history, whether any of the data points for the subsequent path history are the same as the data points for the first path history; and
generating, using the subsequent data packet received from the remote vehicle, a modified path history for the remote vehicle, the modified path history including data points for the subsequent path history that do not include data points for the first path history.

5. The method of claim 1, wherein the one or more processors are located on an ego vehicle.

6. The method of claim 5, further comprising:
determining the geometry for a proceeding portion of the roadway for the ego vehicle.

7. The method of claim 6, further comprising:
determining, based on the geometry for the proceeding portion of the roadway for the ego vehicle, a path for the ego vehicle to follow along the proceeding portion of the roadway; and
causing the ego vehicle to implement the path.

8. The method of claim 7, wherein determining the path comprises:
determining, based on the geometry for the proceeding portion of the roadway for the ego vehicle and a lateral offset between a current location of the ego vehicle and one of the previous locations defining the path history of the remote vehicle, the path for the ego vehicle to follow along the proceeding portion of the roadway.

9. The method of claim 6, further comprising:
determining, based on the geometry for the proceeding portion of the roadway for the ego vehicle, an upcoming curve in the roadway; and
causing, as the ego vehicle approaches the upcoming curve in the roadway, a reduction in speed of the ego vehicle.

10. The method of claim 1, further comprising:
storing the first location and heading of the remote vehicle, the first location and heading of the remote vehicle subsequently being re-used in determining the path history upon receipt of subsequent data packets from the remote vehicle.

11. The method of claim 1, further comprising:
comparing the determined geometry for the portion of the roadway preceding the remote vehicle with a digital road geometry associated with a map; and
verifying the digital road geometry based on the comparison.

12. The method of claim 1, further comprising:
providing generated data points between two or more data points along the path history for the remote vehicle, the generated data points and the two or more data points forming an interpolated path history,
wherein determining, using the path history, comprises:
determining, using the interpolated path history, the geometry for the portion of the roadway preceding the remote vehicle.

13. The method of claim 1, wherein the preceding portion of the roadway extends between one or more of the plurality of locations forming the path history.

14. The method of claim 1, wherein determining the geometry for the portion of the roadway preceding the remote vehicle comprises:
determining, using at least one of an Unscented Kalman filter and a Cubature Kalman filter, the geometry for the portion of the roadway preceding the remote vehicle based, at least in part, on the path history and data generated by one or more sensors and corresponding to the remote vehicle.

15. A system for determining one or more features of a roadway, the system comprising:
a communications device configured to receive a data packet from a remote vehicle, the data packet including data corresponding to a first location and a first heading of the remote vehicle;
a processor operatively connected to the communications device; and
memory operatively connected to the processor, the memory storing instructions that, when executed by the processor, cause the processor to:
determine, based on the data packet received from the remote vehicle, a path history for the remote vehicle, the path history including data points corresponding to a plurality of locations and headings including the first location and heading and one or more previous locations and headings; and
determine, using on the path history, a geometry for a portion of the roadway preceding the remote vehicle.

16. The system in claim 15, further comprising:
one or more sensors positioned to observe the remote vehicle as the remote vehicle travels along the roadway over time and capture data corresponding to the location of the remote vehicle over time, and wherein determine the geometry comprises:
determine, using the path history for the remote vehicle and data generated by the one or more sensors, the geometry for the portion of the roadway preceding the remote vehicle.

17. The system of claim 15, wherein the path history is a first path history, and wherein the memory further stores instructions to:
receive a subsequent data packet from the remote vehicle including a subsequent first location and heading of the remote vehicle and data points for a subsequent path history;
determine, based on the subsequent path history, whether any of the data points for the subsequent path history are the same as the data points for the first path history; and
generate, using the subsequent data packet received from the remote vehicle, a modified path history for the remote vehicle based on the subsequent path history, the modified path history including data points for the subsequent path history that do not include data points for the first path history.

18. The system of claim 15, wherein the system is at least partially implemented on an ego vehicle.

19. The system of claim 18, wherein the memory further stores instructions to:
  determine a geometry for a proceeding portion of the roadway for the ego vehicle based at least partially on the determined geometry for the preceding portion of the roadway for the remote vehicle.

20. The system of claim 19, further comprising:
  one or more actuators operatively connected to one or more components of the ego vehicle, the one or more actuators usable to control the one or more components of the remote vehicle and thereby at least partially control maneuvering of the remote vehicle, and wherein the memory further stores instructions to:
    determine, based on the determined geometry for the proceeding portion of the roadway for the ego vehicle, a path for the ego vehicle to follow along the proceeding portion of the roadway; and
    cause the ego vehicle to implement the path.

21. The system of claim 20, wherein determine the path for the ego vehicle to follow along the proceeding portion of the roadway comprises:
  determine, based on the determined geometry for the proceeding portion of the roadway for the ego vehicle and a lateral offset between a current location of the ego vehicle and one of the previous locations defining the path history of the remote vehicle, the path for the ego vehicle to follow along the proceeding portion of the roadway.

22. The system of claim 20, wherein the memory further stores instructions to:
  identify, based on the determined geometry for the proceeding portion of the roadway for the ego vehicle, an upcoming curve in the roadway; and
  cause, as the ego vehicle approaches the upcoming curve in the roadway, a reduction in speed of the ego vehicle.

23. The system of claim 15, further comprising:
  a map accessible by the communications device and the processor, the map including data corresponding to a digital road geometry for the portion of the roadway preceding the remote vehicle, wherein the memory further stores instructions to:
    compare the determined geometry for the portion of the roadway preceding the remote vehicle with the digital road geometry corresponding to the map; and
    verify the digital road geometry based on the comparison.

24. The system of claim 15, wherein the memory further stores instructions to:
  provide generated data points between two or more data points along the path history for the remote vehicle, the generated data points and the two or more data points forming an interpolated path history, and wherein determine, using the path history, comprises determine, using the interpolated path history, the geometry for the portion of the roadway preceding the remote vehicle.

25. The system of claim 15, wherein the preceding portion of the roadway extends between two or more of the plurality of locations forming the path history.

26. The system of claim 15, wherein determine the geometry for the portion of the roadway preceding the remote vehicle comprises:
  determine, using at least one of an Unscented Kalman filter and a Cubature Kalman filter, the geometry for the portion of the roadway preceding the remote vehicle based, at least in part, on the path history and data generated by one or more sensors and corresponding to the remote vehicle.

27. The system of claim 15, wherein the determined geometry is expressed as any one of piecewise polynomial segments and clothoids.

28. The system of claim 15, wherein the data packet further includes the one or more previous locations and headings of the remote vehicle.

* * * * *

UNITED STATES PATENT AND TRADEMARK OFFICE
CERTIFICATE OF CORRECTION

PATENT NO. : 10,782,704 B2
APPLICATION NO. : 15/883675
DATED : September 22, 2020
INVENTOR(S) : Vladimeros Vladimerou et al.

Page 1 of 1

It is certified that error appears in the above-identified patent and that said Letters Patent is hereby corrected as shown below:

In the Specification

Column 8, Line 50:
Delete "$x^n(s)=x_0{}^n+A_1{}^n s+A_1{}^n s^2+A_3{}^n s^3$" and insert -- $x^n(s) = x_0^n + A_1^n s + A_2^n s^2 + A_3^n s^3$ --

Column 9, Line 20:
Delete "$c^n(s)$=where $c_0{}^{n}$" and insert -- $c^n(s) = c_0^n + c_1^n s$ where $c_0^n$ --

Column 11, Line 30:
Delete "$r_k=[y_k{}^{off}, \varphi^n, c_{0,k}, c_{1,k}{}^1, \ldots c_{1,k}{}^N]^T$" and insert -- $r_k = \left[y_k^{off}, \varphi^n, c_{0,k}, c_{1,k}^1, \ldots c_{1,k}^N\right]^T$ --

Column 11, Line 35:
Delete "$c_{0,k}, c_{1,k}{}^1, \ldots c_{1,k}{}^N$" and insert -- $c_{0,k}, c_{1,k}^1, \ldots c_{1,k}^N$ --

Column 13, Line 58:
Delete "modlue(s)" and insert --module(s)--

Column 13, Line 65:
Delete "modlue(s)" and insert --module(s)--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*